(12) United States Patent
Schaub et al.

(10) Patent No.: US 11,135,995 B2
(45) Date of Patent: Oct. 5, 2021

(54) FORCE-LIMITING DEVICE AND SEAT BELT SYSTEM

(71) Applicant: TRW Automotive GmbH, Alfdorf (DE)

(72) Inventors: Swen Schaub, Göppingen (DE); Christian Muecke, Mögglingen (DE); Simon Gargallo, Winterbach (DE); Günter Burkhardtsmaier, Göggingen (DE); Bernd Gentner, Ellwangen/Pfahlheim (DE); Oliver Gross, Schwäbisch Gmünd (DE); Simon Kramer, Schorndorf (DE); Andreas Pregitzer, Ellenberg (DE); Marco Wahl, Sulzbach-Laufen (DE); Malke Seiler, Mutlangen (DE); Nizam Bedak, Schwäbisch Gmünd (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 138 days.

(21) Appl. No.: 16/465,607

(22) PCT Filed: Dec. 1, 2017

(86) PCT No.: PCT/EP2017/081157
§ 371 (c)(1),
(2) Date: May 31, 2019

(87) PCT Pub. No.: WO2018/100141
PCT Pub. Date: Jun. 7, 2018

(65) Prior Publication Data
US 2019/0381970 A1    Dec. 19, 2019

(30) Foreign Application Priority Data

Dec. 2, 2016 (DE) .......................... 102016123307.2

(51) Int. Cl.
*B60R 22/185* (2006.01)
*B60R 21/01* (2006.01)
(Continued)

(52) U.S. Cl.
CPC ............ *B60R 22/185* (2013.01); *B60R 21/01* (2013.01); *B60R 22/1954* (2013.01); *B60R 22/34* (2013.01); *B60R 2021/01265* (2013.01)

(58) Field of Classification Search
CPC ................. B60R 22/185; B60R 21/01; B60R 22/1954; B60R 22/34; B60R 2022/285;
(Continued)

(56) References Cited

U.S. PATENT DOCUMENTS

| 4,032,174 | A | | 6/1977 | Andres et al. | |
|---|---|---|---|---|---|
| 4,394,992 | A | * | 7/1983 | Fohl | B60R 22/28 188/65.3 |
| 5,358,276 | A | * | 10/1994 | Lane, Jr. | B60R 22/185 280/806 |

(Continued)

FOREIGN PATENT DOCUMENTS

| DE | 2943441 A1 * | 4/1981 | ............ B60R 22/28 |
|---|---|---|---|
| DE | 3229260 | 2/1984 | |

(Continued)

OTHER PUBLICATIONS

Machine Translation of DE-3229260-A1 (Year: 1984).*

*Primary Examiner* — James A English
*Assistant Examiner* — Kurtis Nielson
(74) *Attorney, Agent, or Firm* — Tarolli, Sundheim, Covell & Tummino LLP

(57) ABSTRACT

A force-limiting device, especially for a seat belt system (10) in a vehicle, has a force transducer (20) interacting with webbing (14) for which a normal webbing path is provided. The force transducer (20) includes a webbing track (30) that (Continued)

in a non-force-limiting position extends in parallel to the normal webbing path and in a force-limiting position extends inclined relative to the normal webbing path so that the force transducer (20) in the force-limiting position sets a predetermined extension force (F) required to move the webbing (14) vis-à-vis the force transducer (20) in a direction of belt extension (R).

18 Claims, 3 Drawing Sheets

(51) Int. Cl.
*B60R 22/195* (2006.01)
*B60R 22/34* (2006.01)

(58) Field of Classification Search
CPC .......... B60R 22/28; B60R 2021/01265; B60R 22/195; B60R 22/42; B60R 22/1855
See application file for complete search history.

(56) References Cited

U.S. PATENT DOCUMENTS

| | | | | |
|---|---|---|---|---|
| 6,409,270 | B1 * | 6/2002 | Meder | ............... B60R 22/185 |
| | | | | 297/463.1 |
| 7,635,150 | B2 * | 12/2009 | Zhou | ............... B60R 22/1951 |
| | | | | 280/806 |
| 10,377,339 | B2 * | 8/2019 | Dix | ............... B60R 22/28 |

FOREIGN PATENT DOCUMENTS

| | | | | | |
|---|---|---|---|---|---|
| DE | 3229260 | A1 * | 2/1984 | ......... | B60R 22/1951 |
| DE | 3229304 | | 2/1984 | | |
| DE | 3421838 | A1 * | 5/1985 | ......... | B60R 22/1951 |
| DE | 34221838 | | 5/1985 | | |
| DE | 3727929 | | 1/1989 | | |
| DE | 19522686 | | 11/1996 | | |
| DE | 10015048 | | 10/2001 | | |
| DE | 102008029351 | | 2/2009 | | |
| DE | 102014005565 | A1 * | 10/2014 | ......... | B60R 22/185 |
| DE | 102015000758 | | 8/2015 | | |
| EP | 0061825 | A2 * | 10/1982 | ......... | B60R 22/1855 |
| FR | 2511320 | | 2/1983 | | |

* cited by examiner

FORCE-LIMITING DEVICE AND SEAT BELT SYSTEM

RELATED APPLICATIONS

This application corresponds to PCT/EP2017/081157, filed Dec. 1, 2017, which claims the benefit of German Application No. 10 2016 123 307.2, filed Dec. 2, 2016, the subject matter of which are incorporated herein by reference in their entirety.

BACKGROUND OF THE INVENTION

The invention relates to a force-limiting device, especially for a seat belt system in a vehicle, as well as to a seat belt system comprising a force-limiting device.

In order to limit the force acting upon the vehicle occupant when the latter moves forward to an acceptable level, there are provided force-limiting devices which, when a predetermined extension force acting on the webbing is exceeded, permit further movement of the webbing and in this way enable further webbing to be extended on the predetermined force level.

It is known to arrange force-limiting devices within the belt retractor or in the area of the belt buckle, for example a torsion rod within the shaft of a belt reel of the belt retractor. For force limitation being effectuated via the webbing it is advantageous when the force limitation acts close to the occupants. When using a force-limiting device within the belt retractor, however, the so-called film-reel effect always has to be taken into account, as in the case of high extension force first the webbing loosely wound onto the belt reel contracts before the force-limiting device will respond.

SUMMARY OF THE INVENTION

It is the object of the invention to provide a flexibly applicable force-limiting device which enables a precisely starting force limitation at a predetermined extension force at low cost.

This object is achieved by the features of claim 1. In a force-limiting device, especially for a seat belt system in a vehicle, there is provided a force transducer interacting with webbing for which a normal webbing path is provided. The force transducer includes a webbing track which in a non-force-limiting position extends in parallel to the normal webbing path and in a force-limiting position extends inclined relative to the normal webbing path so that the force transducer in the force-limiting position provides a predetermined extension force required for moving the webbing in a belt extension direction vis-à-vis the force transducer. The predetermined extension force defines the force threshold from which the force limiter admits further extension of webbing. Said force threshold is realized by increased friction between the webbing and the force transducer, specifically the webbing track thereof, by deflecting the webbing by the inclined webbing track and pulling the webbing over edges and/or surfaces of the webbing track, which entails increased friction force.

The webbing track may extend linearly in both positions. However, the webbing track advantageously extends linearly in the non-force-limiting position, while in the force-limiting position it forms an angle at least at one point and preferably at plural points. Of advantage, all portions of the webbing track extend inclined relative to the normal webbing path, wherein the angle of inclination may vary for different webbing track portions. The amount of the predetermined extension force can be easily influenced by the amount of the respective angle and the number of changes of direction of the webbing path.

The webbing track is preferably formed in at least one through-hole of the force transducer, with the webbing advantageously extending in all positions through the through-hole. In this way, the webbing is ensured to be caught when the webbing track is inclined and the webbing path is varied as desired.

The force-limiting effect of the force transducer is preferably achieved merely by changing the position of the force transducer without the latter substantially deforming.

In order to permit easy inclination of the webbing track, the force transducer preferably has at least one movable part at which at least one portion of the webbing track is formed. The movable part is arranged to be rotatable or pivotable about an axis of rotation into the force-limiting position.

The axis of rotation is aligned especially perpendicularly to the webbing extension direction and in parallel to a surface area of the webbing. This arrangement helps to rotate or pivot the webbing track so that the webbing is uniformly loaded over its entire width.

It is also advantageous to this end when the through-hole extends through the axis of rotation.

For example, the movable part can be moved from the non-force-limiting position into the force-limiting position by an angle from about 30° to 180°, especially from about 90° to 150°, about its axis of rotation. It has turned out that by such inclination of the webbing track sufficient friction forces can be produced between the force transducer and the webbing to adjust the webbing extension force to a desired force level.

Via the angle of rotation about which the movable part is moved about its axis of rotation to incline at least a portion of the webbing track, the predetermined extension force can be adjusted, with the predetermined extension force increasing with an increasing angle of rotation. If higher force acts upon the webbing in the direction of belt extension, the webbing slides relative to the force transducer, wherein the extending movement is decelerated by the wound webbing path.

Preferably, the movable part is biased into its force-limiting position and a blocking device is provided for retaining the movable part in the non-force-limiting position. By releasing the blocking device, the force transducer thus can be transferred to its force-limiting position within a split second. Accordingly, it is possible to design the force-limiting device such that it responds simultaneously with or even prior to blocking of the belt reel in a belt retractor.

The biasing force should be selected to be higher than the predetermined extension force so that the angular position of the movable part is not varied by the force acting on the webbing.

For releasing the blocking device, for example an actuator, especially a pyrotechnical actuator interacting with the blocking device is provided. Of course, it is also imaginable to move the movable part directly by the actuator.

The bias can be easily built up by a spring element. The spring element can be a spiral spring, for example, which extends especially between the axis of rotation and an outer wall of the movable part and which is fixed at said points. An end-face arrangement of the spring element at the movable part and thus on the side of the webbing has turned out to be advantageous.

By setting the bias, i.e. for example by a defined spring force, the extension force can be predetermined. The movable part is rotated to the force-limiting position by the bias. If the occupant moves forward, the predetermined extension force is then brought about. In so doing, the movable element is not statically held in its rotational position. Variations of the friction forces have no or only little influence in this situation, as the angle or rotation of the movable part is set by the predefined bias. Webbing is prevented, if the force-limiting device is released and is not fixed in the position of linearly extending webbing, from being extended by the rotation of the movable part until the predetermined extension force is reached. When the extension force reaches the predetermined level, the movable element is rotated against the bias until a balance will be reached. Variations e.g. of the friction values are compensated due to the bias in this case.

It is possible to design the force transducer so that the predetermined extension force can be variably adjusted in order to provide e.g. appropriate restraint for vehicle occupants of different height and weight and/or in different situations. For this purpose, especially a spring element the spring characteristic of which is variable and, resp., adjustable can be utilized. One option in this respect consists in varying the clamping.

In the afore-described arrangement, this can be easily realized by variable bias, as the bias has an effect on the angle of rotation and thus a direct connection is given between the bias and the predetermined extension force. In this way, the rotation of the movable part and thus the angle of inclination of the webbing track and, consequently, the predetermined extension force can be variably adjusted.

It is an option to fabricate the spring element from a shape memory alloy (SMA) which in two different forms has different spring loads, wherein the different forms may be adjusted by different temperatures by current flow.

It is possible to provide only one single movable part, however preferably at least two movable parts are provided which are arranged in series and especially have a substantially identical structure. A preferred embodiment includes exactly two movable parts.

Adjacent movable parts are advantageously moved in different directions of rotation about their respective axes of rotation in order to achieve an as strongly wound webbing path as possible. The movement of the adjacent movable parts in opposite directions helps to double the angle between the adjacent webbing track portions in the movable parts, thus causing the friction force for the webbing to be significantly increased.

Such movement of adjacent movable parts in opposite directions can be easily achieved, for example, by providing meshing teeth at the outer faces of the movable parts. It is usually sufficient when only one of the movable parts is driven, for example by a biased spring element.

The afore-mentioned object is further achieved by a seat belt system comprising a belt retractor winding up and unwinding webbing and a force-limiting device as afore described. The webbing extends through the webbing track, wherein in the force-limiting position of the force transducer the webbing extends at an angle vis-à-vis the normal path, which entails increased friction force acting on the webbing.

The force transducer may be arranged at a distance from the belt retractor in the webbing extension direction ahead of the belt retractor. Thus, the force-limiting device can be a component separate from the belt retractor, which, on the one hand, offers the advantage that the space provided in the vehicle can be better used and, on the other hand, offers the advantage that the force transducer can be easily combined with a plurality of different belt retractors and, retractor tensioners, respectively.

The force transducer may be disposed especially between the belt retractor and a belt deflection or even in the belt extension direction ahead of the belt deflection.

In a preferred embodiment, the force transducer is designed so that its predetermined extension force can be adjusted, for example depending on a height, a weight or a position of a vehicle occupant, a vehicle velocity, a vehicle deceleration and/or a webbing extension characteristic. Also, other parameters such as release parameters of an airbag system and a detection of a child safety seat may be considered to define the predetermined extension force.

As afore-described, the predetermined extension force can be easily adjusted by variably adjusting an angle of inclination of the webbing track and, resp., of individual webbing track portions in the force-limiting position of the force transducer and the friction force increased in this way, for example by adapting a biasing force of the movable parts of the force transducer into the force-limiting position.

BRIEF DESCRIPTION OF THE DRAWINGS

Hereinafter, the invention shall be illustrated by way of an example embodiment with reference to the attached drawings, wherein.

DESCRIPTION

Figure 1:
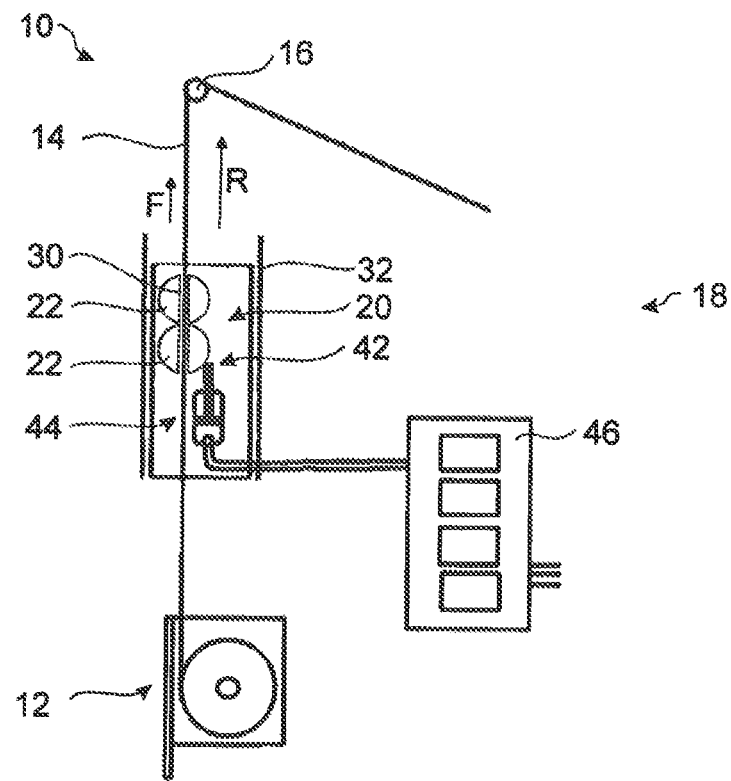
FIG. 1 shows a schematic view of a seat belt system according to the invention comprising a force-limiting device according to the invention, a force transducer of the force-limiting device being provided in its non-force-limiting position.

FIG. 1 illustrates a seat belt system 10, for example in a passenger car, comprising a belt retractor 12 adapted to unwind and wind up webbing 14. The webbing 14 is guided from the belt retractor 12 via a belt deflection 16 to a vehicle occupant (not shown) as this is known, for example, from a common three-point belt. However, the seat belt system 10 could also comprise a lap belt only or could include separate lap and shoulder belts.

Figure 2:
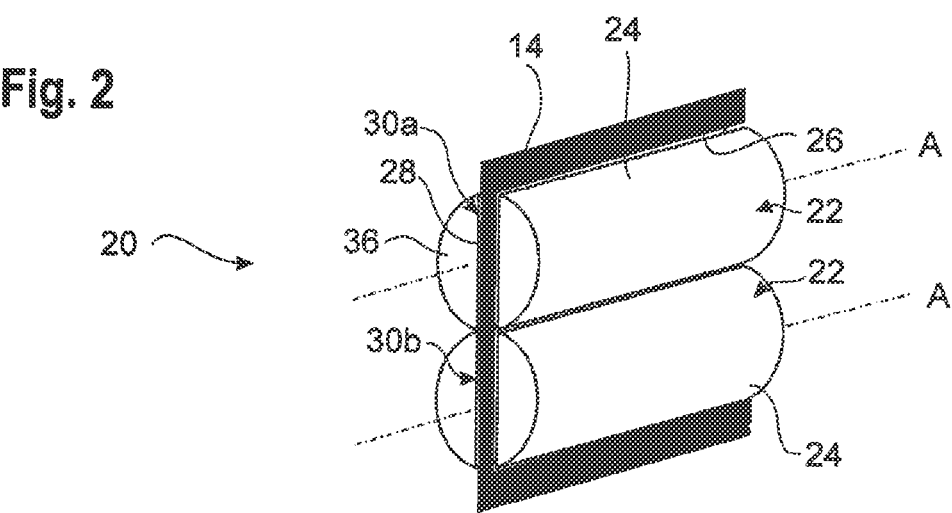
FIG. 2 shows the force transducer of the force-limiting device of FIG. 1 in the non-force-limiting position in a schematic perspective view.
Figure 3:
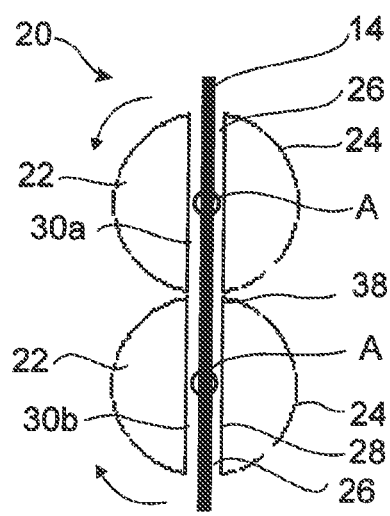
FIG. 3 shows the force transducer of FIG. 2 in a schematic sectional view in the non-force-limiting position.

Further, a force-limiting device 18 is provided which in this case is configured as a unit separate from the belt retractor 12 and which is designed to define a predetermined extension force F which forms a force threshold from which the webbing 14 can be moved in a direction of belt extension R. The force limiting device 18 comprises a force transducer 20 which may adopt a non-force-limiting position and a force-limiting position. In the non-force-limiting position as shown in FIGS. 1 to 3, the webbing 14 extends linearly in a normal webbing path, and there are no friction forces acting between the webbing 14 and the force transducer 20.

In the embodiment shown here, the force transducer 20 includes two movable parts 22 which are in the form of a cylinder having an outer face 24 and, respectively, in the form of a through-hole 26, the through-hole 26 extending through an axis of rotation A of the respective movable part 22. The axis of rotation A coincides with the respective longitudinal axis of the movable part 22. The two through-holes 26 are arranged in alignment with each other in the non-force-limiting position so that the webbing 14 extends through the through-holes 26 without contacting the inner walls 28 of the through-hole 26. Each of the through-holes 26 constitutes a portion 30a, 30b of a webbing track 30 that extends, as illustrated in FIGS. 1 to 3, in the non-force-limiting position in the direction of webbing extension R and is linear.

Each of the movable parts 22 is rotatably supported about its axis of rotation A, in this case at a housing 32 of the force limiting device 18 surrounding the force transducer 20.

It is also imaginable to dispose only one single movable part 22 or else more than two movable parts 22 in series in the direction of webbing extension R.

The two movable parts 22 are disposed so that they may rotate about a respective predetermined angle of rotation α. In so doing, the two movable parts are rotating in opposite directions.

For coordinating the rotation, teeth 34 being in mesh with each other and being formed in the area of an end face 36 here are provided at an outer periphery on the outer face 24.

Figure 4:
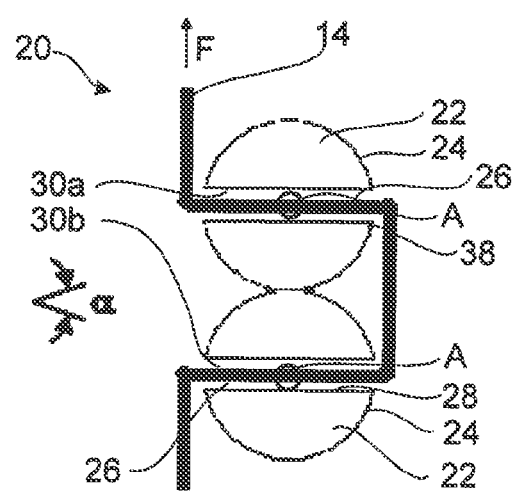
FIG. 4 shows the force transducer of FIG. 3 in the force-limiting position having a first angle of rotation.
Figure 5:
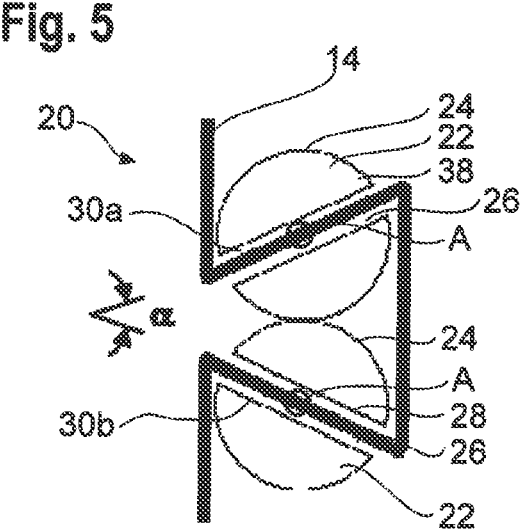
FIG. 5 shows the force transducer of FIG. 3 in the force-limiting position having a second angle of rotation.
Figure 6:
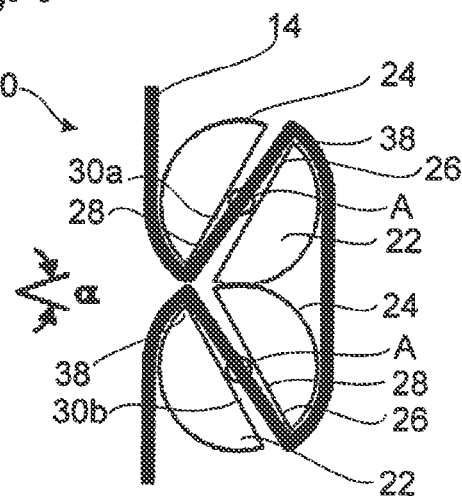
FIG. 6 shows the force transducer of FIG. 3 in the force-limiting position having a third angle of rotation.

In order to transfer the force transducer to the force-limiting position, the two movable parts 22 are rotated about their axis of rotation A so that the through-holes 26 and thus also the webbing track portions 30a, 30b are inclined vis-à-vis the normal webbing path (cf. FIGS. 4 to 6). In the illustrated examples, both of the movable parts 22 are rotated by the same amount of the angle α but in the opposite direction of rotation. As a matter of course, also differently large angles could be chosen, however.

Accordingly, the webbing 14 contacts the inner walls 28 and the outer edges 38 of the through-holes 26 so that a friction force is formed between the webbing track 30 and the webbing 14. The friction force produced in this way corresponds to the predetermined extension force F and permits movement of the webbing 14 relative to the force transducer 20 only when said force threshold has been exceeded. When the force acting at the webbing 14 in the direction of webbing extension R is higher, the webbing 14 slides through the through-holes 26 relative to the force transducer 20, wherein the friction acting decelerates the webbing extension. Below the predetermined extension force F, the force transducer 20 will completely block any movement of the webbing 14 in this case.

The predetermined extension force F can be adjusted via the angle of rotation α of the individual movable parts 22, with the predetermined extension force F increasing with an increasing angle of rotation α.

In FIG. 4, the upper one of the two movable parts 22 in the Figures has been rotated about 90° to the left, whereas the lower movable part 22 in the Figures has been rotated to the right. Correspondingly, the two through-holes 26 and, thus, the webbing track portions 30a, 30b are in parallel to each other again, but now they are perpendicular to the normal webbing path, and the webbing 14 is deflected four times on the whole approximately at right angles.

FIGS. 5 and 6 illustrate further force-limiting positions in which each of the two movable parts 22 is rotated about 120° (FIG. 5) and, resp., 150° (FIG. 6). The two webbing track portions 30a, 30b of the individual movable parts 22, viz. the two through-holes 26, are arranged at an angle of about 60° and, resp., of 120° relative to each other.

The force-limiting positions of the force transducer 20 illustrated in FIGS. 4 to 6 successively produce higher predetermined extension forces F, as the respective angle by which the webbing 14 is deflected between the outer face 24 and the through-hole 26 of the movable parts 22 is smaller, which increases friction between the webbing 14 and the movable part 22. While in the force-limiting position in FIG. 4 the webbing 14 is deflected by 90°, in FIG. 5, for example, it is deflected by 60° and in FIG. 6 merely by 30° in each case.

The force transducer 20 in this example is biased to the force-limiting position. For this purpose, at least one of the movable parts 22 includes a spring element 40 which acts between the axis of rotation A and the outer face 24 and is biased such that it may rotate the respective movable part 22 by the desired angle α about the axis of rotation A.

Figure 7:
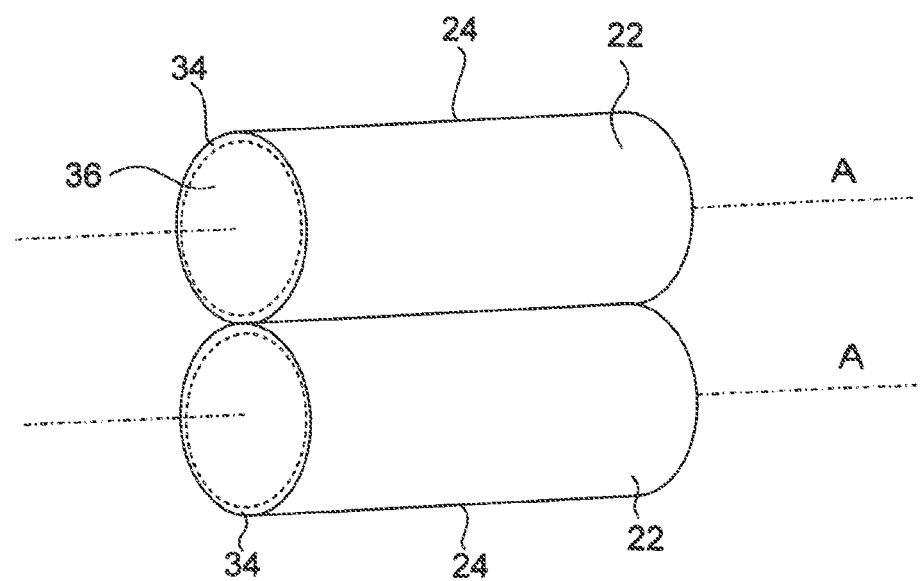
FIG. 7 shows the meshing of two adjacent movable parts of the force transducer of FIG. 2.
Figure 8:
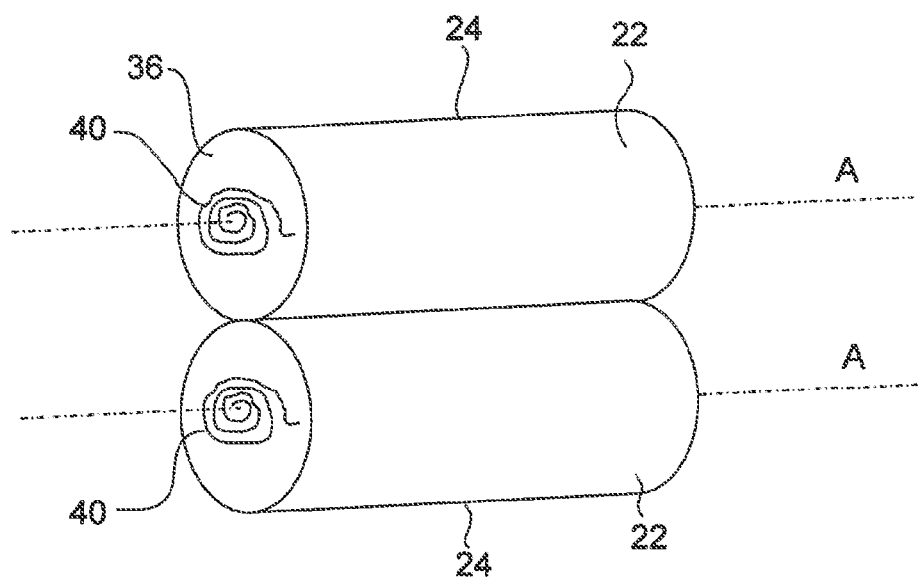
FIG. 8 shows the force transducer of FIG. 2 including indicated spring elements for producing a bias.

This is indicated in FIG. 8. In that case, each of the two movable parts 22 has a spring element 40. When, as shown in FIG. 7, teeth 34 are formed on the outer face 24, it may be sufficient to provide only one of the movable parts 22 with a spring element 40.

The spring hardness of the spring elements 40 is selected such that it is higher than the predetermined extension force F so that the movable parts 22 are retained in the rotated position and the angle of rotation α thereof will not vary even if the webbing 14 moves relative to the force transducer 20.

In order to keep the movable parts 22 biased in the non-force-limiting position, a blocking device 42 not shown in detail is provided for retaining the movable parts 22 in the non-force-limiting position until the force-limiting device 18 is activated. For releasing the blocking device 42 an actuator 44, in this case a pyrotechnical actuator, is provided (cf. FIG. 1) which, when activated, acts upon and releases the blocking device 42 so that the movable parts 22 may rotate unhindered about the axes of rotation A thereof. For example, a plunger of a gas generator which prior to activation retains the movable parts 22 in the non-force-limiting position may be moved away.

The actuator 44 is connected to a control unit 46 which is equally part of the force-limiting device 18. On the one hand, via the control unit 46 the time of activation of the force-limiting device 18 may be provided by triggering the actuator 44. On the other hand, in a preferred embodiment also the deflecting angle α of the movable parts 22 can be adjusted via the control unit 46.

This may be done, for example, in that the bias can be varied by the spring elements 40. The bias is then set depending on various parameters prior to each activation of the force-limiting device 18. Parameters are, for example, the height, the weight and the position of a vehicle occupant, a webbing extension characteristic, vehicle velocity, a vehicle deceleration as well as parameters of airbag control and/or occupation of a child safety seat.

One option for varying the bias of the spring element 40 consists in fabricating the latter from a shape memory alloy (SMA), with the spring elements 40 taking different shapes which produce different biases. For selecting the respective shape, the temperature of the spring element 40 is varied by energizing the latter.

The force transducer 20 along with the actuator 44 and the housing 32 is disposed at a distance from the belt retractor 12 in this case, viz. between the belt retractor 12 and the belt deflection 16. It would also be possible to dispose said sub-assembly in the direction of belt extension R ahead of the belt deflection 16. Also, said sub-assembly might be fitted directly to the belt retractor 12, but preferably as a separate unit so that it can be combined with any belt retractors 12 (including possibly present belt tensioners).

During normal operation of the seat belt system 10, the webbing 14 extends freely through the webbing track portions 30a, 30b of the two movable parts 22 of the force transducer 20 of the force-limiting device 18. If a condition is detected in which belt extension force is to be limited to a particular force threshold, the control unit 46 activates the actuator 44 that releases the blocking device 42 so that the movable parts 22 will rotate by the selected bias about the selected angle α and the force transducer 20 will adopt its force-limiting position. The webbing 14 now extends through the webbing track portions 30a, 30b of the two movable parts 22 with high friction so that it can be moved relative to the force transducer 20 only when the predetermined extension force F is exceeded.

The invention claimed is:

1. A force-limiting device for a seat belt system (10) in a vehicle, comprising a force transducer (20) interacting with webbing (14) for which a normal webbing path is provided, wherein the force-transducing member (20) has a webbing track (30) that in a non-force-limiting position extends in parallel to the normal webbing path and in a force-limiting position extends inclined relative to the normal webbing path so that the force transducer (20) in the force-limiting position sets a predetermined extension force required for moving the webbing (14) vis-à-vis the force transducer (20) in a direction of webbing extension (R), wherein the force transducer (20) has at least two movable parts (22) which have a substantially identical structure and which are disposed in series in the webbing extension direction (R), and wherein at each movable part (22) at least a portion of the webbing track (30) is configured, the movable parts being rotatable or pivotable about an axis of rotation (A) to the force-limiting position, and wherein the axis of rotation (A) is aligned to the direction of webbing extension (R) and in parallel to a surface area of the webbing (14).

2. The force-limiting device according to claim 1, wherein the webbing track (30) is formed in at least one through-hole (26).

3. The force-limiting device according to claim 1, wherein the movable part (22) is moved from the non-force-limiting position to the force-limiting position by an angle (α) from 30° to 180° about its axis of rotation (A).

4. The force-limiting device according to claim 1, wherein the movable part (22) is biased into the force-limiting position and a blocking device (42) which keeps the movable part (22) in the non-force-limiting position is provided.

5. The force-limiting device according to claim 4, wherein an actuator (44) interacting with the blocking device (42) is provided.

6. The force-limiting device according to claim 4, wherein a spring element (40) producing the bias is provided.

7. The force-limiting device according to claim 4, wherein the force transducer (20) is designed so that the bias can be variably adjusted.

8. The force-limiting device according to claim 4, wherein a pyrotechnical actuator interacting with the blocking device (42) is provided.

9. The force-limiting device according to claim 1, wherein the movable parts (22) are moved about the respective axes of rotation (A) in different directions of rotation.

10. The force-limiting device according to claim 9, wherein meshing teeth (34) are provided on an outer face (24) of the movable parts (22).

11. A seat belt system comprising a belt retractor (12) which winds up and unwinds the webbing (14) and comprising the force-limiting device (18) according to claim 1, wherein the webbing (14) extends through the webbing track (30) and in the force-limiting position of the force transducer (20) the webbing (14) extends at an angle vis-à-vis the normal path.

12. The seat belt system according to claim 11, wherein the force transducer (20) is disposed at a distance from the belt retractor (12) in the direction of webbing extension (R) ahead of the belt retractor (12) or in the direction of webbing extension (R) ahead of a belt deflection (16).

13. The seat belt system according to claim 11, wherein the force transducer (20) is configured so that the predetermined extension force can be adjusted.

14. The seat belt system according to claim 13, wherein an angle of inclination of the webbing track (30) can be adjusted.

15. The seat belt system according to claim 11, wherein the force transducer (20) is disposed at a distance from the belt retractor (12) in the direction of webbing extension (R) ahead of the belt retractor (12) between the belt retractor (12) and a belt deflection (16).

16. The seat belt system according to claim 11, wherein the force transducer (20) is configured so that the predetermined extension force can be adjusted depending on at least one of a height, a weight or a position of a vehicle occupant, a vehicle velocity, a vehicle deceleration and a webbing extension characteristic.

17. The force-limiting device according to claim 1, wherein the axis of rotation (A) is perpendicular to the direction of belt extension (R).

18. The force-limiting device according to claim 1, wherein the movable part (22) is moved from the non-force-limiting position to the force-limiting position by an angle (α) from about 90° to 150°, about its axis of rotation (A).

* * * * *